(12) United States Patent
Pal et al.

(10) Patent No.: US 8,434,994 B2
(45) Date of Patent: May 7, 2013

(54) SYSTEM AND METHOD FOR MODIFYING ROTOR THRUST

(75) Inventors: Dipankar Pal, Greenville, SC (US); Andres Jose Garcia-Crespo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 930 days.

(21) Appl. No.: 12/534,584

(22) Filed: Aug. 3, 2009

(65) Prior Publication Data

US 2011/0027064 A1 Feb. 3, 2011

(51) Int. Cl.
*F01D 3/00* (2006.01)

(52) U.S. Cl.
USPC ............... 415/1; 415/104; 415/111; 415/115; 415/116; 415/199.5

(58) Field of Classification Search .............. 415/1, 111, 415/112, 104, 115, 116
See application file for complete search history.

(56) References Cited

U.S. PATENT DOCUMENTS

| 4,578,018 | A | | 3/1986 | Pope |
| 4,697,981 | A | | 10/1987 | Brown |
| 4,864,810 | A | * | 9/1989 | Hines ............................ 60/775 |
| 5,167,484 | A | * | 12/1992 | Ponziani et al. .................. 415/1 |
| 5,760,289 | A | * | 6/1998 | Skottegard ..................... 73/1.08 |
| 5,862,666 | A | * | 1/1999 | Liu ................................ 60/726 |
| 6,487,863 | B1 | | 12/2002 | Chen |
| 2007/0122265 | A1 | | 5/2007 | Ansari et al. |
| 2007/0234729 | A1 | | 10/2007 | West et al. |

* cited by examiner

*Primary Examiner* — Ninh H Nguyen
(74) *Attorney, Agent, or Firm* — Dority & Manning, P.A.

(57) ABSTRACT

A gas turbine includes a compressor, a turbine downstream of the compressor having stators, and a rotor connecting the compressor to the turbine. The rotor includes rotor cavities. A supply plenum containing a process by-product gas and a control valve is connected to at least one of the rotor cavities to supply the process by-product gas to at least one of the rotor cavities. A process for operating a gas turbine having a compressor and a turbine includes connecting the compressor to the turbine by a rotor, creating cavities in the rotor, and injecting a process by-product gas into at least one of the cavities. The process further includes regulating the flow of the process by-product gas into at least one of the cavities according to a pre-programmed parameter.

17 Claims, 5 Drawing Sheets

SYSTEM AND METHOD FOR MODIFYING ROTOR THRUST

FIELD OF THE INVENTION

The present invention generally involves a system and method for modifying the axial thrust on a rotor. Specifically, the present invention supplies a process by-product gas to rotor cavities to generate an axial thrust on the rotor of a gas turbine.

BACKGROUND OF THE INVENTION

Gas turbines are widely used in commercial operations for power generation. FIG. 1 illustrates a typical gas turbine 10 known in the art. As shown in FIG. 1, the gas turbine 10 generally includes a compressor 12 at the front, one or more combustors 14 around the middle, and a turbine 16 at the rear. The compressor 12 and the turbine 16 typically share a common rotor 18.

The compressor 12 includes multiple stages of compressor blades 20 attached to the rotor 18. Ambient air enters an inlet 22 of the compressor 12, and rotation of the compressor blades 20 imparts kinetic energy to the working fluid (air) to bring it to a highly energized state. The working fluid exits the compressor 12 and flows to the combustors 14.

The working fluid mixes with fuel in the combustors 14, and the mixture ignites to generate combustion gases having a high temperature, pressure, and velocity. The combustion gases exit the combustors 14 and flow to the turbine 16 where they expand to produce work.

Compression of the ambient air in the compressor 12 produces an axial force on the rotor 18 in a forward direction, toward the compressor inlet 22. Expansion of the combustion gases in the turbine 16 produces an axial force on the rotor 18 in an aft direction, toward the turbine exhaust 24. A thrust bearing 26 at the front of the gas turbine 10 holds the rotor 18 in place and prevents axial movement of the rotor 18. To reduce the net axial force on the rotor 18, and thus the size and associated cost of the thrust bearing 26, the gas turbine 10 is typically designed so that the axial forces generated by the compressor 12 and the turbine 16 are of comparable magnitude.

FIG. 1 illustrates one design for controlling the net axial rotor force. Air extraction lines 28 connect the compressor 12 to the turbine 16. The air extraction lines 28 provide a pathway for working fluid to bypass the combustors 14 and flow directly to the turbine 16. Separate air extraction lines 28 connect earlier stages of the compressor 12 to later stages of the turbine 16. Through this arrangement, the extracted working fluid has a greater pressure than the combustion gases at the injected turbine stage, thus ensuring that the extracted working fluid travels in the same direction as the combustion gases. The extracted working fluid enters the turbine 16 and joins the flow of combustion gases through the turbine 16, thus increasing the axial force on the rotor 18 in an aft direction, toward the turbine exhaust 24.

The design shown in FIG. 1 has several disadvantages. For example, the extracted working fluid bypasses the combustors 14, thus reducing the volume of combustion gases and overall efficiency and output of the gas turbine 10.

In addition, since the compressor 12 is rotationally coupled to the turbine 16 by the rotor 18, the amount and pressure of the extracted working fluid available is directly dependent on the operating level of the gas turbine 10. While acceptable during steady state operations, this design is less than ideal during partial load operations or transients when the compressor 12 operating level, and thus compressor axial thrust, may be substantially different from the turbine 16 operating level, creating an imbalance in axial forces on the thrust bearing 26 that can result in vibration and instabilities. As a result, the thrust bearing 26 must be larger to accommodate a greater variance in the net axial rotor force during transient conditions or at various operating levels. Moreover, as the amount and pressure of extracted working fluid varies directly according to the operating level of the gas turbine, the design geometry of the turbine rotor is necessarily constrained to produce a desired axial thrust at any given operating level.

Therefore, the need exists for a system and method to control the axial rotor forces independent of the operating levels of either the compressor or the turbine. Ideally, the system and method will minimize the net axial thrust on the thrust bearing during both steady state and transient operating levels, will not reduce the overall efficiency of the gas turbine, and will accommodate optimum rotor geometry to reduce part weight and cost.

BRIEF DESCRIPTION OF THE INVENTION

Aspects and advantages of the invention are set forth below in the following description, or may be obvious from the description, or may be learned through practice of the invention.

One embodiment of the present invention is a gas turbine that includes a compressor, a turbine downstream of the compressor that includes a plurality of stators, and a rotor connecting the compressor to the turbine. The rotor includes a plurality of rotor cavities. The gas turbine further includes a supply plenum containing a process by-product gas. The supply plenum includes a control valve and is connected to at least one of the rotor cavities to supply the process by-product gas to at least one of the rotor cavities.

In another embodiment of the present invention, a gas turbine includes a compressor, a turbine downstream of the compressor that includes a plurality of stators, and a rotor connecting the compressor to the turbine. The rotor includes a plurality of rotor cavities. The gas turbine further includes a supply plenum containing a process by-product gas. The supply plenum is connected to at least one of the rotor cavities to supply the process by-product gas to at least one of the rotor cavities. A controller regulates the flow of the process by-product gas to at least one of the rotor cavities.

Another embodiment of the present invention is a process for operating a gas turbine having a compressor and a turbine. The process includes connecting the compressor to the turbine by a rotor, creating a plurality of cavities in the rotor, and injecting a process by-product gas into at least one of the plurality of cavities. The process further includes regulating the flow of the process by-product gas into at least one of the plurality of cavities according to a pre-programmed parameter.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION

Figure 1:
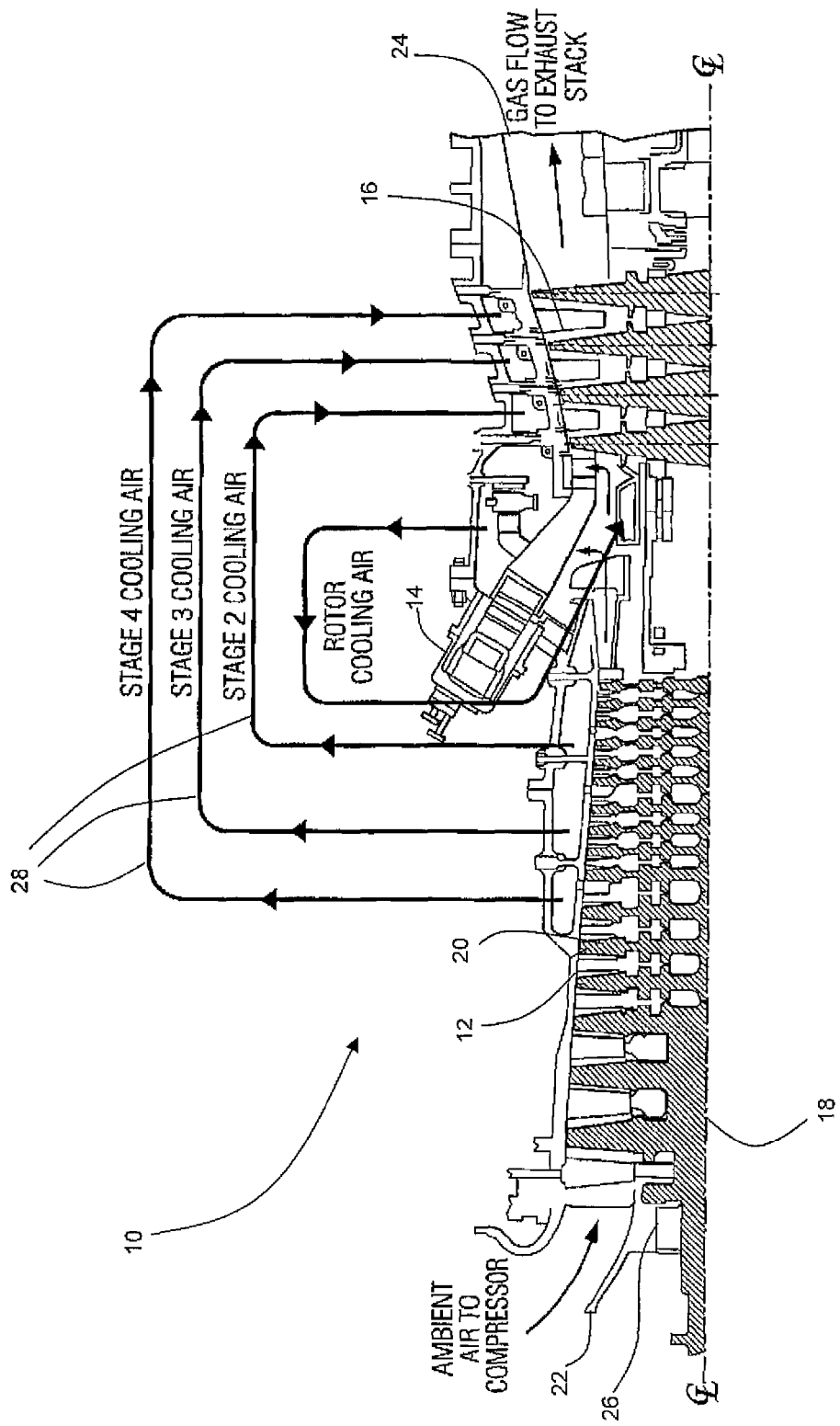
FIG. 1 illustrates a prior art design for controlling the net axial rotor force.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 2:
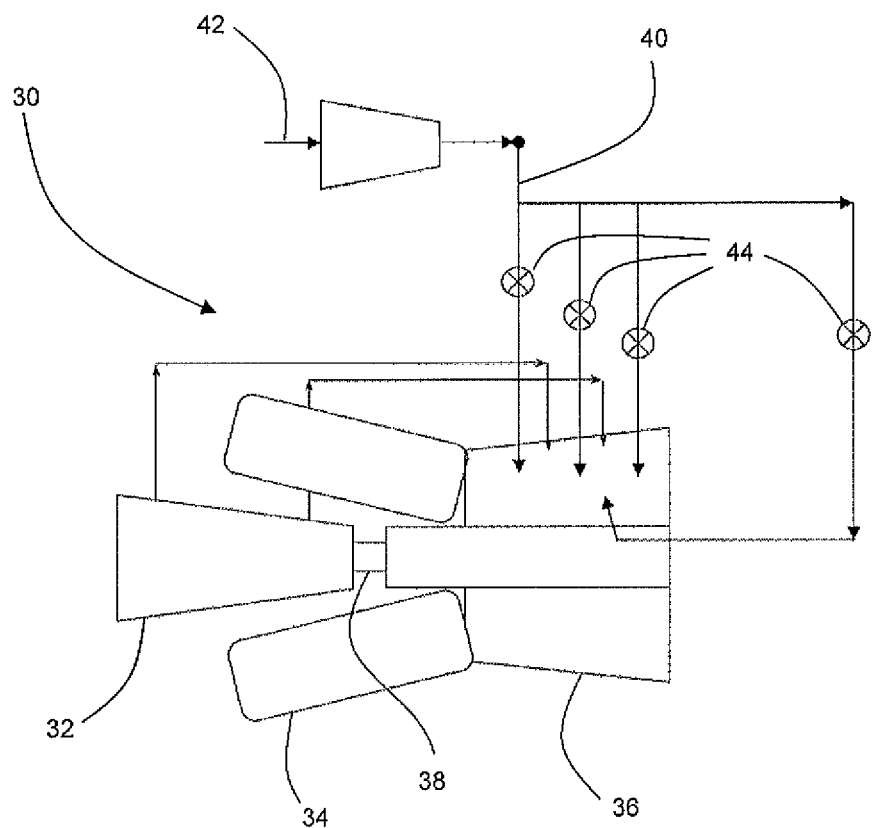
FIG. 2 is a system diagram of one embodiment of the present invention.

FIG. 2 shows a block diagram of a gas turbine 30 according to one embodiment of the present invention. As shown in FIG. 2, the gas turbine 30 generally includes a compressor 32 at the front, one or more combustors 34 around the middle, and a turbine 36 at the rear. The compressor 32 and the turbine 36 share a common rotor 38.

The gas turbine 30 further includes a supply plenum 40 containing a process by-product gas 42. The supply plenum 40 may include one or more control valves 44 and is connected to cavities in the rotor 38 to supply the process by-product gas to at least one of the rotor cavities. The process by-product gas 42 may be any effluent gas produced by a commercial system other than the gas or working fluid produced by the compressor 32. For example, an integrated gasification combined cycle (IGCC) plant typically includes an air separation unit for producing oxygen from air. The air separation unit generates large volumes of effluent nitrogen as a process by-product gas. Nitrogen is a suitable process by-product gas for use in the present invention because it has a molecular weight similar to the working fluid. However, other effluent process by-product gases may be used and fall within the scope of the present invention.

Figure 3:
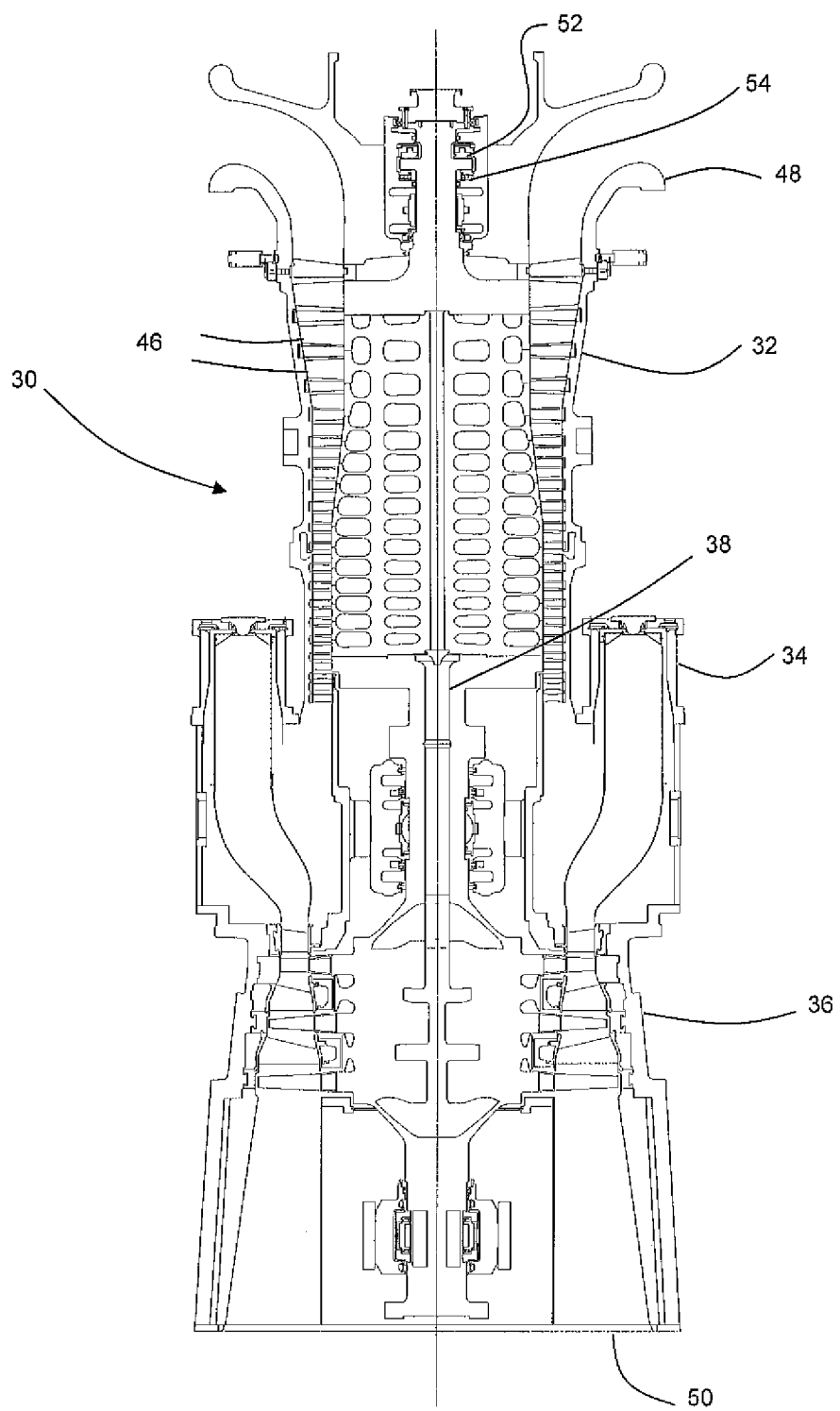
FIG. 3 is a simplified cross-section of the gas turbine shown in FIG. 2.

FIG. 3 provides a simplified cross-section of the gas turbine 30 shown in FIG. 2. The compressor 32 includes multiple stages of compressor blades 46 attached to the rotor 38. Ambient air enters an inlet 48 of the compressor 32, and rotation of the compressor blades 46 imparts kinetic energy to the working fluid (air) to bring it to a highly energized state. The working fluid exits the compressor 32 and flows to the combustors 34.

The working fluid mixes with fuel in the combustors 34, and the mixture ignites to generate combustion gases having a high temperature, pressure, and velocity. The combustion gases exit the combustors 34 and flow to the turbine 36 where they expand to produce work.

Compression of the ambient air in the compressor 32 produces an axial force on the rotor 38 in a forward direction, toward the compressor inlet 48. Expansion of the combustion gases in the turbine 36 produces an axial force on the rotor 38 in an aft direction, toward the turbine exhaust 50. A thrust bearing 52 at the front of the gas turbine 30 holds the rotor 38 in place and prevents axial movement of the rotor 38. Although FIG. 3 illustrates the thrust bearing 52 at the front of the gas turbine 30, the thrust bearing 52 may be located at any position along the rotor 38. To reduce the net axial force on the rotor 38, and thus the size and associated cost of the thrust bearing 52, the gas turbine 30 is ideally designed so that the axial forces generated by the compressor 32 and the turbine 36 are approximately equal but opposite.

A thrust bearing sensor 54 may be used to measure the amount and direction of axial thrust being applied by the rotor 38 to the thrust bearing 52. The sensor 54 may be a piezoelectric bridge configured to measure the direction and force applied to the thrust bearing 52.

Figure 4:
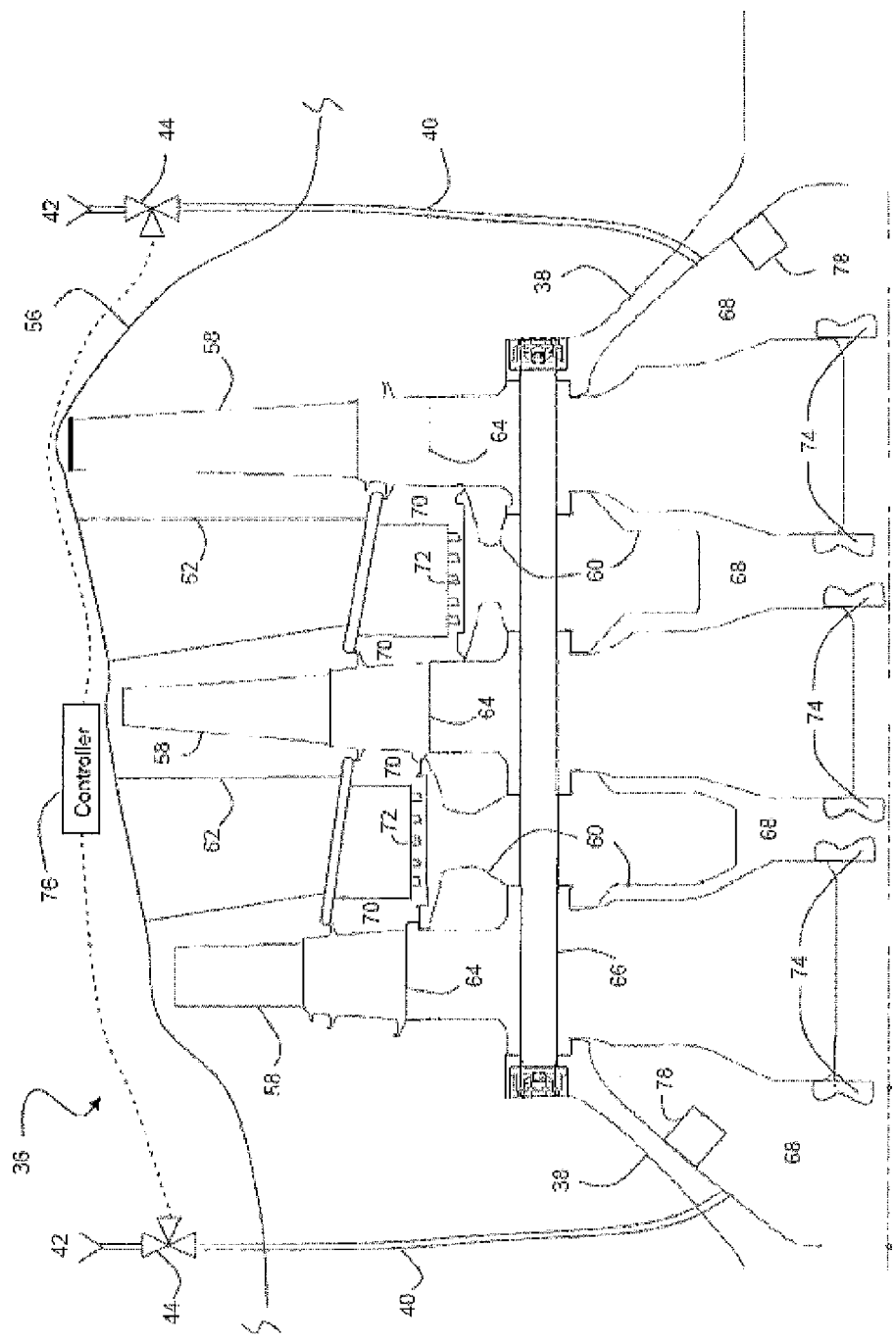
FIG. 4 is a simplified cross-section of the turbine shown in FIG. 3 according to one embodiment of the present invention.

FIG. 4 provides a simplified cross-section of the turbine 36 shown in FIG. 3 according to one embodiment of the present invention. A turbine casing 56 surrounds alternating rows of rotating airfoils 58, rotating spacers 60, and stationary nozzles or stators 62. The airfoils 58 attach to wheels 64, and a bolt 66 connects the wheels 64 and rotating spacers 60 to the rotor 38. The stators 62 attach to the casing 56.

Combustion gases from the combustors 34 flow to the turbine 36. As the combustion gases pass over the airfoils 58, the combustion gases expand, causing the airfoils 58, wheels 64, spacers 60, and rotor 38 to rotate. The combustion gases then flow to the stators 62 which redirect the combustion gases to the next row of rotating airfoils 58, and the process repeats for the following stages.

The rotor 38 includes various cavities, referred to as rotor-rotor cavities 68 and rotor-stator cavities 70. A diaphragm seal 72 between the stators 62 and rotating spacers 60 creates a boundary for the rotor-stator cavities 70 and prevents or restricts flow between adjacent rotor-stator cavities 70. Similarly, a barrier 74 at the interior of the wheels 64 prevents or restricts flow between adjacent rotor-rotor cavities 68 within the rotor 38. As a result, adjacent rotor-rotor cavities 68 may have different internal pressures, thereby creating an axial force on the rotor 38.

As shown in FIG. 4, the supply plenum 40 containing the process by-product gas 42 may connect to each side of the rotor 38. A controller 76 directs the positioning of the control valves 44 in each supply plenum 40 to regulate flow of the process by-product gas 42 to the rotor-rotor cavities 68. The process by-product gas 42 increases the pressure in the rotor-rotor cavities 68 to create a pressure differential between the rotor-rotor cavities 68 and produce an axial thrust on the rotor 38 in either direction, according to the direction of the controller 76. In addition, the process by-product gas 42 purges the rotor-rotor cavities 68 of any hot combustion gases, thereby lowering the temperature in the rotor-rotor cavities 68.

The controller 76 may receive signals from any of multiple sources to determine the appropriate positions of the control valves 44 to achieve the desired pressure differential between the rotor-rotor cavities 68. For example, the thrust bearing sensor 54 (shown in FIG. 3) may send a signal to the controller 76 reflective of the direction and amount of the net axial force being applied to the thrust bearing 52, and the controller 76 may then adjust the position of the control valves 44 to achieve a desired net axial force on the thrust bearing 52. In alternate embodiments, the rotor 38 may include sensors 78 in the rotor-rotor cavities 68. The sensors 78 may send a signal to the controller 76 reflective of the pressure or temperature in the rotor-rotor cavities 68, and the controller 76 may then adjust the position of the control valves 44 to achieve a desired pressure differential between the rotor-rotor cavities 68 or temperature in the rotor-rotor cavities 68. In still further embodiments, the controller 76 may receive a signal reflective of the operating level of the compressor 32, combustors 34, or turbine 36 and adjust the control valves 44 according to a pre-programmed schedule to achieve the desired axial thrust on the rotor 38 for a given power level.

Figure 5:
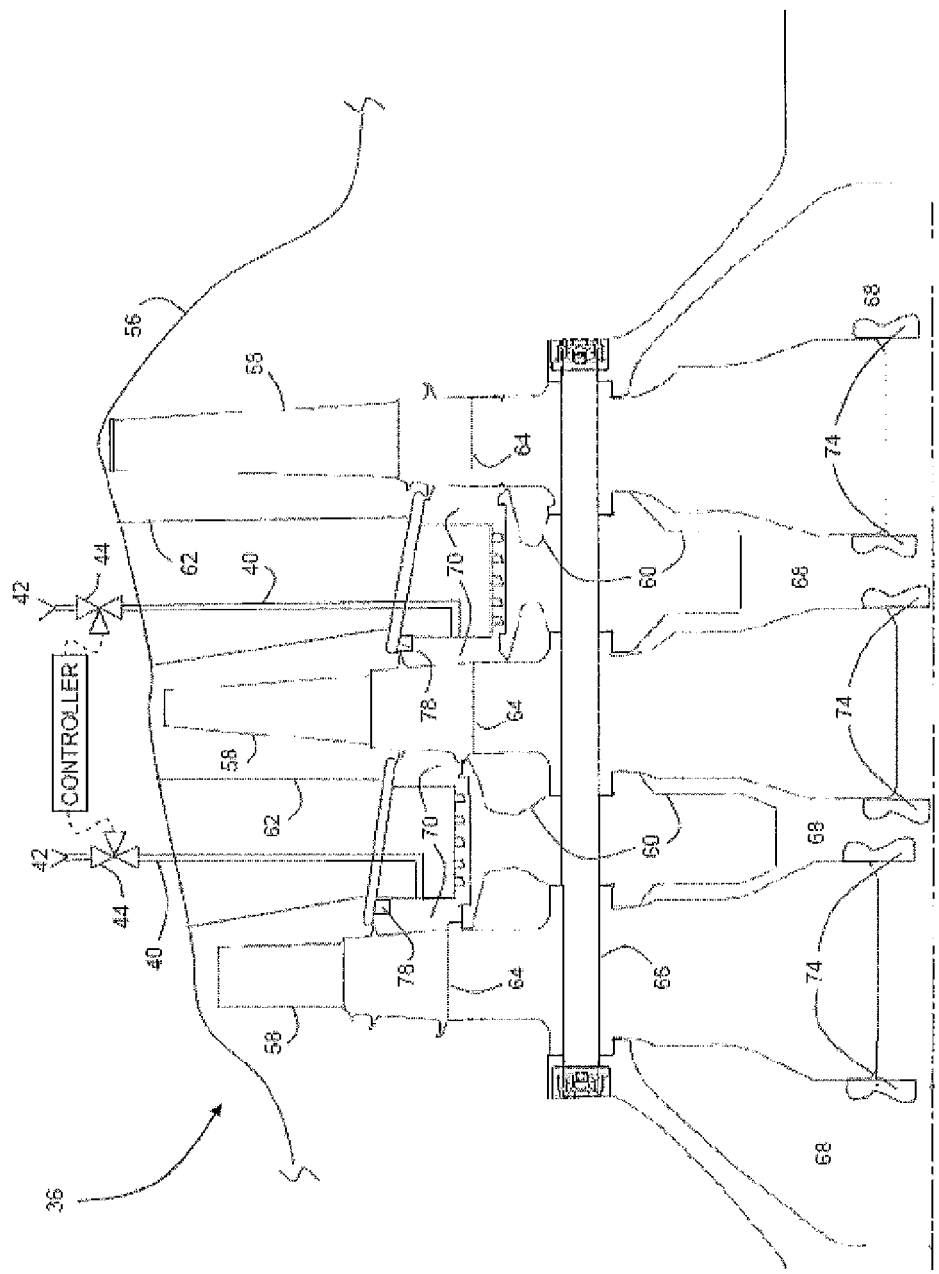
FIG. 5 is a simplified cross-section of the turbine shown in FIG. 3 according to an alternate embodiment of the present invention.

FIG. 5 is a simplified cross-section of the turbine shown in FIG. 3 according to an alternate embodiment of the present invention. The components of the turbine 36 are as described with respect to FIG. 4. In this embodiment, the supply plenum 40 containing the process by-product gas 42 passes through the casing 56 and stators 62 to provide the process by-product gas to the rotor-stator cavities 70. The controller 76 again directs the positioning of the control valves 44 in each supply plenum 40 to regulate flow of the process by-product gas 42 to the rotor-stator cavities 70. The process by-product gas 42 increases the pressure in the rotor-stator cavities 70 to create axial thrust on the spacers 60, and thus the rotor 38, in either direction, according to the direction of the controller 76. In addition, the process by-product purges the rotor-stator cavities of any high temperature combustion gases and prevents any high temperature combustion gases from entering the rotor-stator cavities during operations, thus preventing the high temperature combustion gases from increasing the temperature of the rotor 38.

As previously discussed with respect to the embodiment shown in FIG. 4, the controller 76 may receive signals from any of multiple sources, such as the thrust bearing sensor 54 (shown in FIG. 3), temperature or pressure sensors 78, or the operating level of the compressor 32, combustors 34, or turbine 36, to determine the appropriate positions of the control valves 44 to achieve the desired pressure differential between the rotor-stator cavities 70 to produce the desired axial thrust.

The present invention further includes a process for operating a gas turbine according to any of the embodiments previously described. Referring to FIGS. 3, 4, and 5, for example, the process connects the compressor 32 to the turbine 36 by the rotor 38. The process further includes creating a plurality of cavities 68, 70 in the rotor 38 and injecting the process by-product gas 42 into at least one of the plurality of cavities 68, 70. The process by-product gas 42 may be injected directly through the rotor 38, as shown in FIG. 4, or through the stators 62, as shown in FIG. 5. The process regulates the flow of the process by-product gas 42 into at least one of the plurality of cavities 68, 70 according to a pre-programmed parameter. The pre-programmed parameter may include, for example, a desired axial thrust on the rotor 38 or a desired temperature or pressure in the rotor cavities 68, 70.

It should be appreciated by those skilled in the art that modifications and variations can be made to the embodiments of the invention set forth herein without departing from the scope and spirit of the invention as set forth in the appended claims and their equivalents.

What is claimed is:

1. A gas turbine, comprising:
   a. a compressor;
   b. a turbine downstream of the compressor, wherein the turbine includes a plurality of stators;
   c. a rotor connecting the compressor to the turbine, the rotor defining a plurality of rotor cavities inside the rotor; and
   d. a supply plenum containing a process by-product gas, wherein the supply plenum includes a control valve and is connected to at least one of the rotor cavities to supply the process by-product gas to at least one of the rotor cavities.

2. The gas turbine of claim 1, wherein the supply plenum is connected to multiple rotor cavities.

3. The gas turbine of claim 1, further including a controller for regulating the flow of the process by-product gas to at least one of the rotor cavities.

4. The gas turbine of claim 3, wherein the controller regulates the flow of the process by-product gas to at least one of the rotor cavities according to a rotor cavity pressure or temperature.

5. The gas turbine of claim 3, wherein the controller regulates the flow of the process by-product gas to at least one of the rotor cavities according to a power level of the turbine.

6. The gas turbine of claim 3, further including a thrust bearing connected to the rotor, wherein the controller regulates the flow of the process by-product gas to at least one of the rotor cavities according to a force on the thrust bearing.

7. A gas turbine, comprising:
   a. a compressor;
   b. a turbine downstream of the compressor, wherein the turbine includes a plurality of stators;
   c. a rotor connecting the compressor to the turbine, the rotor defining a plurality of rotor cavities inside the rotor;
   d. a supply plenum containing a process by-product gas, wherein the supply plenum is connected to at least one of the rotor cavities to supply the process by-product gas to at least one of the rotor cavities; and
   e. a controller for regulating the flow of the process by-product gas to at least one of the rotor cavities.

8. The gas turbine of claim 7, wherein the supply plenum is connected to multiple rotor cavities.

9. The gas turbine of claim 7, further including a pressure or temperature sensor in at least one of the plurality of rotor cavities.

10. The gas turbine of claim 7, further including a thrust bearing connected to the rotor, wherein the controller regulates the flow of the process by-product gas to at least one of the rotor cavities according to a force on the thrust bearing.

11. The gas turbine of claim 7, further including a signal reflective of a power level of the turbine, supplied to the controller.

12. The gas turbine of claim 7, further including a control valve in the supply plenum.

13. A process for operating a gas turbine having a compressor and a turbine, comprising:
   a. connecting the compressor to the turbine by a rotor;
   b. creating a plurality of cavities inside the rotor;
   c. injecting a process by-product gas into at least one of the plurality of cavities; and
   d. regulating the flow of the process by-product gas into at least one of the plurality of cavities according to a pre-programmed parameter.

14. The process of claim 13, further including receiving the process by-product gas into at least one of the plurality of cavities through the rotor.

15. The process of claim 13, further including regulating the flow of the process by-product gas into at least one of the plurality of cavities according to a pressure or temperature in the cavities.

16. The process of claim 13, further including regulating the flow of the process by-product gas into at least one of the plurality of cavities according to a power level of the turbine.

17. The process of claim 13, further including regulating the flow of the process by-product gas into at least one of the plurality of cavities according to a force on the rotor.

* * * * *